United States Patent [19]

Nola

[11] 3,860,858

[45] Jan. 14, 1975

[54] VARIABLE FREQUENCY INVERTER FOR AC INDUCTION MOTORS WITH TORQUE, SPEED AND BRAKING CONTROL

[75] Inventor: Frank J. Nola, Huntsville, Ala.

[73] Assignee: The United States of America as represented by the Administration of the National Aeronautics and Space Administration, Washington, D.C.

[22] Filed: Dec. 19, 1973

[21] Appl. No.: 426,155

[52] U.S. Cl.................. 318/227, 318/230, 318/231
[51] Int. Cl. .............................................. H02p 5/40
[58] Field of Search...................... 318/227, 230, 231

[56] References Cited
UNITED STATES PATENTS

| | | | |
|---|---|---|---|
| 3,588,648 | 6/1971 | Paine ................... | 318/227 |
| 3,662,247 | 5/1972 | Schieman.................. | 318/231 X |
| 3,671,831 | 6/1972 | Chausse et al...................... | 318/227 |
| 3,700,986 | 10/1972 | Cushman et al..................... | 318/227 |
| 3,805,135 | 4/1974 | Blaschke............................ | 318/227 |

*Primary Examiner*—G. Z. Rubinson
*Attorney, Agent, or Firm*—George J. Porter; L. D. Wofford, Jr.; John R. Manning

[57] ABSTRACT

A variable frequency inverter for driving an AC induction motor which varies the frequency and voltage to the motor windings in response to varying torque requirements for the motor so that the applied voltage amplitude and frequency are of optimal value for any motor load and speed requirement. The slip frequency of the motor is caused to vary proportionally to the torque and feedback is provided so that the most efficient operating voltage is applied to the motor. Winding current surge is limited and a controlled negative slip causes motor braking and return of load energy to a DC power source.

6 Claims, 1 Drawing Figure

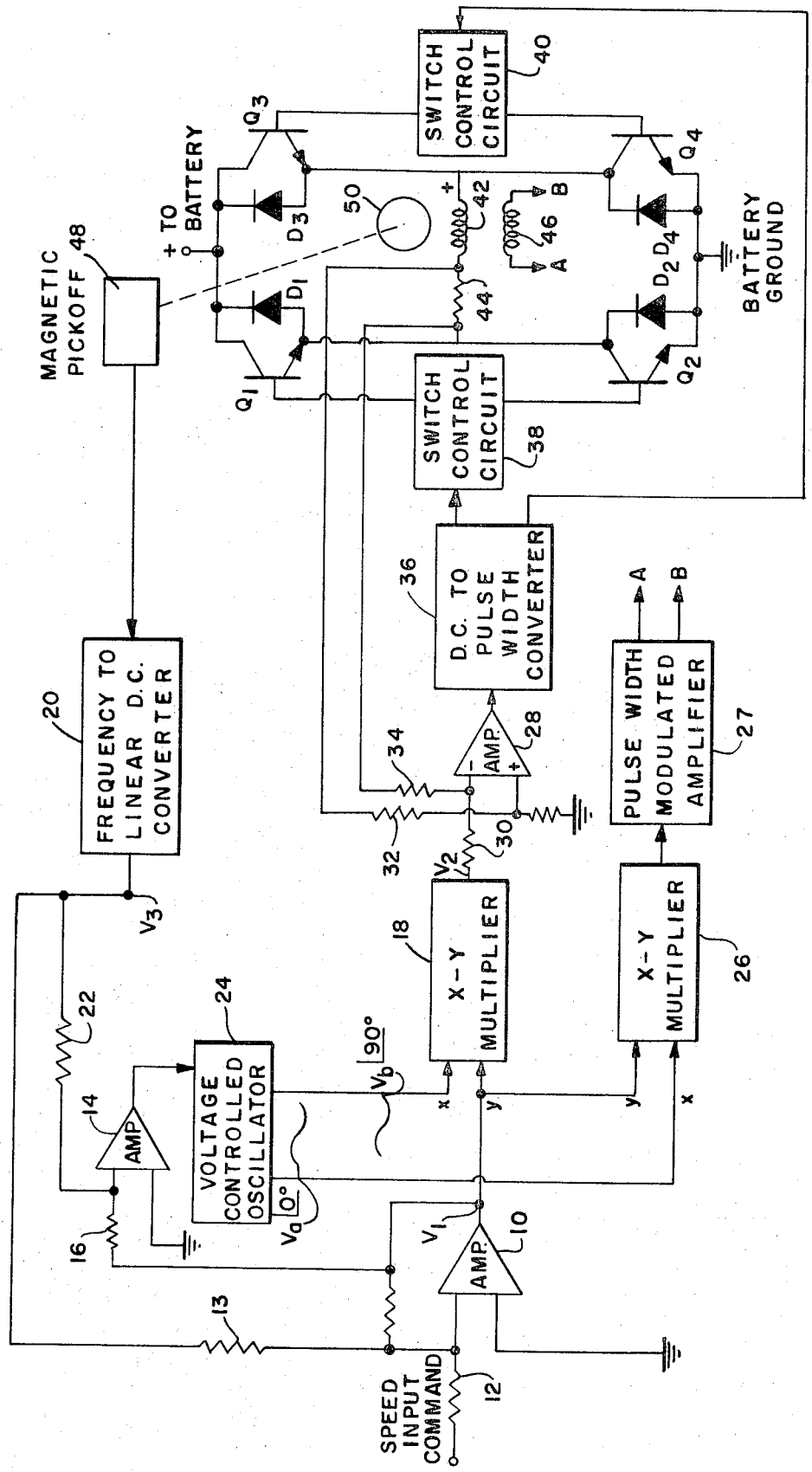

VARIABLE FREQUENCY INVERTER FOR AC INDUCTION MOTORS WITH TORQUE, SPEED AND BRAKING CONTROL

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates generally to the control of torque and speed of an AC induction motor, and more specifically, to the control of high speed, high efficiency AC induction motors which characteristically have low resistance windings and are powered by a DC supply such as a battery.

Typically, drive motor applications which require variable speed utilize DC motors while AC induction motors are used in situations requiring constant speed. This is so because the speed of a DC motor can be varied by merely varying the voltage applied to it. On the other hand, to vary the speed of an AC induction motor the frequency of the drive signals must be varied, and the voltage must also be varied to maintain proper torque. Therefore, in the past it has been common practice to use DC motors for variable speed applications because of the simpler control system required, even though AC induction motors are less expensive and more rugged and versatile. The use of brush type DC motors is limited by many environmental factors. Permanent magnet DC motors are limited by their size and the speed at which they can operate.

A purpose of the present invention is to allow the use of AC induction motors in applications where DC motors are typically used at present by providing a control system for AC induction motors which automatically varies the amplitude and frequency of the drive voltage in response to a single speed input command.

SUMMARY OF THE INVENTION

The above recited purpose, as well as other objects of the invention recited below, is attained by driving the AC induction motor by means of a variable frequency inverter. A DC control voltage is applied to the input terminal of the inverter. Another DC voltage, which is related to the speed of rotation of the rotor, is combined with the control voltage and applied to the control input of a voltage controlled oscillator. The oscillator output is multiplied by the control voltage to produce a sinusoid with an amplitude proportional to the control voltage. The sinusoid is converted to a pulse train with the width of the pulses being variable. The pulses are fed to the motor winding to drive the motor. As will be further explained below, the control voltage commands the slip frequency while the speed proportional voltage represents the actual rotor speed, so that the sum of the two voltages provides for a motor drive voltage frequency of optimum value.

In order to keep the applied voltage to the minimum required to drive the load at the speed being commanded, the speed proportional voltage is fed back to, and summed negatively with, the control voltage.

It is contemplated that the present invention has particular utility in applications where the torque of the motor relative to the inertia of the load is small and the inrush of current normally associated with motors running at less than top speed must be limited and controlled. The present invention provides a means for sensing the current through the motor winding and feeding back a signal to the pulse train generating circuit to limit the pulse width of the pulses so that the pulses provide less than a predetermined maximum current through the winding.

The invention also pertains to applications where the motor must be used as a brake to decelerate its load and must return the energy stored in the momentum of the load to the power source. Suitable circuitry is provided to accomplish this function and will be described below.

Typical applications of the control system of the present invention would be as a drive motor for a planetary exploration vehicle, a reaction wheel motor for space satellite control, or a drive motor for an energy storage momentum wheel where the wheel could supply energy to a satellite during those periods when the main power source may not be available or sufficient. In the latter case, the wheel drives the motor as an induction generator and the electronic controller of this invention allows the energy to be returned to the source or to be supplied to other systems on the spacecraft.

The input command to the control system is a variable DC voltage. The speed of the motor is infinitely variable from stall to maximum rated speed and is proportional to the input command voltage. The torque automatically adjusts to the load from no load to full rated load to satisfy the speed input command. An increase in the speed input command causes the motor to accelerate and a decrease causes it to brake.

Accordingly, it is an object of the present invention to provide a control system for an AC induction motor which automatically excites the motor winding at a frequency equal to the sum of the synchronous frequency and the ideal slip frequency.

It is another object of the present invention to provide a control system for an AC induction motor which automatically applies to the motor winding the minimum voltage necessary to drive the load at the speed being commanded.

It is a further object of the present invention to provide a control system for an AC induction motor with a low resistance winding which limits and controls the surge current applied to the winding.

It is still another object of the present invention to provide a control system for an AC induction motor powered by a DC source which returns energy to the source from the load when the motor is being braked.

BRIEF DESCRIPTION OF THE DRAWING

Other objects, advantages and novel features of the present invention will become apparent from the following detailed description of the invention when considered in conjunction with the accompanying drawing, wherein the FIGURE is a partial schematic and partial functional block diagram of a preferred embodimemt of the invention.

DESCRIPTION OF THE PREFERRED EMBODIMENT

Referring now to the FIGURE, the DC speed input command is applied to amplifier 10 through input resistor 12. The output of amplifier 10, shown as $V_1$, is fed to a summing amplifier 14 through resistor 16 and to X-Y multipliers 18 and 26. Summing amplifier 14 also receives a DC signal, shown as $V_3$, from a frequency to linear DC converter 20 through resistor 22. $V_3$ is also fed to the input of amplifier 10 through resistor 13. The output of the summing amplifier is fed to a voltage controlled oscillator (VCO) 24 of the type which provides two output sinewaves of identical frequency but 90° out of phase. One of the VCO outputs, shown as $V_a$, is fed to X-Y multiplier 26 while the other output, shown as $V_b$, is fed to X-Y multiplier 18. It should be understood that the preferred embodiment is designed to drive a two-phase induction motor, and this is the reason that two out of phase signals are provided. The output of X-Y multiplier 18, shown as $V_2$, is fed to a first signal processing channel to control one phase winding of the motor while the output of X-Y multiplier 26 is fed to a second channel 27 to control the other phase winding. Since the signal channels are the same, only one channel is shown and described. The channels are pulse width modulated amplifiers of the type disclosed in U.S. Pat. No. 3,260,912 and U.S. Pat. No. 3,523,228.

The output of multiplier 18 is fed to a high gain amplifier 28 through resistor 30. Amplifier 28 also receives a feed-back signal through resistors 32 and 34, as will be described further below. The output of amplifier 28 is fed to a DC-to-pulse width converter 36 which provides variable width pulses to switch control circuits 38 and 40. The switch control circuits are connected to the bases of, and thereby control the conduction of, transistors $Q_1$, $Q_2$, $Q_3$ and $Q_4$, each of which has a diode $D_1$, $D_2$, $D_3$ and $D_4$, respectively, connected in parallel with it. The collectors of $Q_1$ and $Q_3$, and the cathodes of diodes $D_1$ and $D_3$, are connected to the positive terminal of a DC source, such as a battery (not shown). The emitters of $Q_2$ and $Q_4$, and the anodes of $D_3$ and $D_4$, are connected to DC ground. The collector of $Q_2$ and the cathode of $D_2$ are connected at a junction point to the emitter of $Q_1$ and the anode of $D_1$. One end of motor winding 42 is also connected to this junction point through feedback resistor 44, which is connected to previously described resistors 32 and 34. The collector of $Q_4$ and the cathode of $D_4$ are connected at a second junction point to the emitter of $Q_3$ and the anode of $D_3$, the other end of motor winding 42 also being connected to this junction point. Also shown is the other motor winding 46 which is connected to pulse width modulated amplifier 27. A magnetic pickoff device 48 senses the frequency of rotation of motor rotating member 50 and provides a signal to previously described converter 20.

The synchronous speed of an AC motor is proportional to the frequency applied to the windings divided by the number of poles. In the induction motor, the squirrel cage rotor can never attain synchronous speed because a finite frequency is required to induce current in the conductors of the rotor. The difference between the speed (frequency) of the applied voltage and the speed of rotor is the slip frequency of the motor. The slip is equal to the ratio of the $I^2R$ loss in the rotor to the torque being delivered by the rotor. In high efficiency motors the $I^2R$ loss is low, hence the slip at rated torque is low. Typically the slip frequency will vary from near zero at no load to 5 percent of maximum frequency at full load. If a frequency higher than the ideal slip frequency is applied, the torque output is greatly reduced because of the reactance of the stator and of the rotor. Hence, if the speed of an induction motor is to be varied and if the motor must produce maximum torque regardless of speed, the applied frequency must be varied and must be equal to the rotor speed plus the slip speed. For example, a two pole motor running at 8,000 rpm has a synchronous frequency of 133.3 Hz. Typically, the motor will develop maximum torque at a slip of 5 percent of 133.3 or about 7 Hz. At stall, the applied frequency for maximum torque must be 7 Hz and the frequency must increase linearally with speed to maintain the 7 Hz difference between rotor speed and applied frequency. At 8,000 rpm, the applied frequency for maximum torque must be about 140 Hz.

The VCO 24 is of the type which generates two fixed amplitude sinusoids locked in phase with respect to each other and shifted 90 electrical degrees, which are required to drive the motor. The frequency is variable from zero to the maximum frequency required by the motor and is proportional to a DC input voltage. As shown in the FIGURE, the DC input voltage is derived from a pulse generator 48 on the shaft 50 of the AC induction motor. The frequency of the pulse generator, which is proportional to shaft speed, is converted to a DC voltage $V_3$ proportional to pulse frequency and hence to shaft speed. This voltage is summed in summing amplifier 14 with the output voltage $V_1$ from amplifier 10 and drives the VCO.

The operation is as follows. A speed input command causes an output voltage $V_1$ from amplifier 10 which is fed in a predetermined proportion through resistor 16 to the VCO. $V_1$ produces the slip frequency out of the VCO required for the amount of torque being commanded by $V_1$. The fixed peak amplitude output from the VCO is fed to multiplier 18 where it is multiplied by the torque command, $V_1$. The output of the multiplier, $V_2$, is then a sinusoid with an amplitude which is proportional to $V_1$. $V_2$ is then fed to the pulse width modulated amplifier (discussed later) which drives one winding 42 of the motor. The motor is at stall and is being driven at the optimum slip frequency for the amount of torque being commanded. Note the torque command and the slip frequency are both proportional to $V_1$. As the motor begins to turn, the output of the Frequency-to-Linear DC Converter 20, $V_3$, begins to increase. $V_3$ is fed in the proper proportion to the VCO. The output frequency from the VCO increases linearly with $V_3$ and hence linearly with shaft speed. Hence, $V_1$ commands the slip frequency and $V_3$ pulls the frequency up with speed so that the applied frequency is always at the optimum value.

In a lightly loaded DC motor the speed is limited only by the applied voltage. The motor will increase in speed if the voltage is increased. The induction motor, however, must have the proper applied frequency as well as proper voltage for efficient operation. If the frequency is held constant and the voltage is increased beyond that required to drive the load, the slip will decrease but the motor will not run faster than synchronous speed. This causes power to be wasted in $I^2R$ losses and in controller losses. The controller of this invention automatically applies the minimum voltage which will drive the load at the speed being commanded. This is accomplished by the speed proportional voltage $V_3$ which is fed back through resistor 13 and summed negatively with the speed voltage at the input of amplifier 10. When the speed reaches the value commanded by the input, $V_3$ reduces the output voltage $V_1$ of amplifier 10 to the amplitude required to satisfy the speed command. If the load increases, a slow down is sensed by a drop in $V_3$ which will cause an increase in $V_1$. An increase in $V_1$ will raise the slip frequency out of the VCO and will increase the current in the motor to drive the larger load. Similarily a decrease in load causes $V_3$ to increase which causes a decrease in $V_1$ and a decrease in the slip and the applied voltage.

In addition to accelerating and controlling the speed of a load, the controller of this invention will cause the motor to act as a generator when decelerating the load and will return part of the energy stored in the load to the power source. (A portion of the stored energy will be used in overcoming losses in motor and controller).

If an induction motor is driven by another motor to a speed above synchronous speed, the slip becomes negative. The rotor conductors then cut the flux of the rotating field in a direction opposite to that which occurs when the machine operates as a motor. The rotor currents then are reversed with respect to the direction that they had when the machine operated as a motor. By transformer action rotor currents induce currents in the stator that are 180° out of phase with the energy component of the stator current that existed when the machine operated as a motor. This in turn causes the back emf to shift 180° from the applied voltage. The counter emf now aids rather than opposes the battery as is normally the case in a motor. The method by which the controller uses the aiding counter emf to return power is discussed later.

The regenerative process is explained as follows. Assume the rotor is turning a large inertia at high constant speed. If the speed input command is reduced to a value smaller than that required to overcome frictional losses in the system, the inertia will back driving the motor. If the speed command is further reduced, the speed proportional voltage $V_3$ will cause the output voltage of amplifier 10 to reverse the polarity of its output which in turn will cause the output frequency of the VCO 24 to drop to a value less than synchronous speed. This then generates the negative slip which is required to cause the motor to act as a generator as discussed in the above paragraph. The output voltage of amplifier 10 also commands the amount of braking torque desired.

The pulse width modulated amplifier used in this control system is of the type discussed in detail in the aforementioned U.S. Pat. No. 3,260,912 and U.S. Pat. No. 3,523,228, the subject matters of which are incorporated by reference herein. To describe its operation very briefly, the sinusoidal input voltage received by amplifier 28 is converted to a constant frequency, fixed amplitude pulse train by DC-to-pulse width converter 36. The frequency of the pulses (PRF) is sufficiently higher than the maximum frequency applied to the windings (greater than 10 times). The width of the pulses is varied and is proportional to the amplitude of the sinusoidal input voltage relative to torque being commanded and operating speed. The pulse train is applied to switch control circuits 38 and 40 to control the conduction of transistors $Q_1$, $Q_2$, $Q_3$ and $Q_4$, and thereby control the current through motor winding 42. As the pulse width modulated amplifier is utilized in the present controller, the pulse frequency and amplitude are held constant, while the pulse width is controlled by both $V_1$ and a DC voltage fed back to amplifier 28 from resistor 44, and is sinusoidally modulated at a frequency controlled by the VCO. The operation of the feedback circuit will be described below.

As previously mentioned, high speed-high efficiency motors have low resistance windings. To prevent inrush currents, current feedback is used in the pulse width modulated amplifier. Recalling that the motor current is continuous even though the applied voltage is a pulse train, the voltage across resistor 44 is continuous and is exactly proportional to motor current. The voltage across resistor 44 is fed back through resistors 32 and 34 and is summed negatively with voltage $V_2$ in high gain amplifier 28. $V_2$ is limited in amplitude so that by selecting proper ratios of feedback to input impedances, the maximum motor current is limited to a value proportional to $V_2$. For example, assume the peak or maximum motor current is to be limited to 10 amps, $V_2$ has a peak value of 1 volt, and resistor $44 = 0.01 \Omega$. At 10 amps, the voltage across resistor $44 = 0.1$ volt. Since the 1 volt of $V_2$ is to null out 0.1 volt, then the input impedance must be 10 times greater than the feedback impedance. When the motor is at stall and a full speed input command is applied, $V_2$ reaches its 1 volt limit, and the output voltage of amplifier 28 will adjust to the value required to generate a pulse train out the DC-to-pulse width converter 36 with a pulse width sufficient to drive 10 amps in the motor. Since the motor is at stall and is producing no work, the battery supplies only the $I^2R$ losses and controller losses. Hence the pulse train will have a narrow duty cycle and the average battery current will be low even though the peak pulse value is 10 amps. As the motor begins to turn, the current will try to decrease because the polarity of counter emf being generated by the motor is in opposition to the battery voltage. This decrease is sensed by resistor 44 and will cause the error voltage out of amplifier 28 to increase which in turn will increase the pulse width to maintain the 10 amps being commanded by $V_2$. The average battery current now increases. This increase in battery current times the battery voltage is the useful output of the motor. Hence the controller of this invention automatically applies the optimum voltage to overcome the back emf plus RI drop so that the motor is always operating at its most efficient voltage.

To explain regenerative braking it is pointed out that switch control circuit 38 slaves transistors $Q_1$ and $Q_2$ so that when one switches on, the other simultaneously switches off, and vice-versa. Similarly switch control circuit 40 slaves $Q_3$ and $Q_4$. Also, when the input voltage $V_2$ is a zero, commanding zero current, $Q_2$ and $Q_4$ are switched on forming a short circuit around the motor winding.

Assume the motor is turning at some speed and the polarity of the instantaneous back emf is as shown. If accelerating torque is commanded ($V_2$ positive) the current path is through $Q_3$, the motor winding 42, resistor 44, and $Q_2$ during the application of the pulse, and, due to the winding inductance, the current "free wheels" and continues to flow through $Q_2$, diode $D_4$, the motor winding and resistor 44 at the zero intervals of the pulse train.

$Q_3$ turns on with a width sufficient to overcome the back emf plus the RI drop. If zero torque is commanded ($V_2 = 0$), $Q_2$ and $Q_4$ are both on and the instantaneous back emf for the polarity indicated will try to drive current through the motor $Q_4$, $D_2$ and resistor 44. This is sensed by resistor 44 and because zero current is being commanded, the polarity of the voltage across resistor 44 being fed back to amplifier 28 is proper to cause $Q_3$ to turn on with a pulse width sufficient to supply an average battery voltage which will null out the back emf being generated by the motor and cause current not to flow. If decelerating torque is commanded, ($V_2$ negative) this allows a larger nulling voltage be developed across resistor 44 (and hence a larger motor current). This means that $Q_3$ is being turned on with a smaller pulse width and allowing a braking current to flow which is generated by back emf. Each time that $Q_4$ switches off and interrupts the current path, the energy stored in the winding inductance forces the current to continue to flow through the path provided by $D_3$, the battery, $D_2$, resistor 44 and the motor winding 42. In this manner energy stored in the load is returned to the source.

Obviously, many modifications and variations of the present invention are possible in light of the above teachings. It is therefore to be understood that, within the scope of the appended claims, the invention may be practiced otherwise than as specifically described.

I claim:

1. A variable frequency inverter for controlling the operation of an AC induction motor powered by a DC source, comprising:
   a summing amplifier which provides a DC output which is the sum of at least two DC inputs;
   a DC amplifier having a DC speed input command signal applied to its input terminal and having its output signal connected to said summing amplifier to provide one of said inputs;
   means responsive to the shaft speed of said motor for generating a DC speed proportional voltage and for applying said voltage to said DC amplifier input terminal and to said summing amplifier to provide another of said inputs;
   a voltage controlled oscillator connected to said summing amplifier output to be controlled thereby;
   means for multiplying the output of said voltage controlled oscillator with said DC amplifier output signal;
   means for receiving the output of said multiplying means and for generating a pulse train in response thereto;
   switching means for switchably connecting a winding of said motor to said DC source; and,
   switch control means for controlling said switching means in response to said pulse train.

2. The variable frequency inverter of claim 1 wherein said pulse train generating means generates pulses the width of which is related to the amplitude of said DC amplifier output signal.

3. The variable frequency inverter of claim 2 further including:
   a resistor connected in series with said motor winding; and,
   means for connecting said resistor to said multiplier output receiving means in a feedback configuration.

4. The variable frequency inverter of claim 2 further including:
   a second means for multiplying the output of said voltage controlled oscillator with said DC amplifier output signal;
   means for receiving the output of said second multiplying means and for generating a second pulse train in response thereto;
   switching means for switchably connecting a second winding of said motor to said DC source; and,
   switch control means for controlling said second winding switching means in response to said second pulse train.

5. The variable frequency inverter of claim 4 wherein:
   said voltage controlled oscillator has a first sinusoid output and a second sinusoid output 90° out of phase with said first sinusoid output;
   said multiplying means is connected to receive said first sinusoid output; and,
   said second multiplying means is connected to receive said second sinusoid output.

6. The variable frequency inverter of claim 3 wherein said pulse train generating means generates pulses the width of which is related to the current passing through said resistor.

* * * * *